United States Patent
Oka

(10) Patent No.: US 7,421,267 B2
(45) Date of Patent: Sep. 2, 2008

(54) LOCAL PUBLIC INFORMATION SYSTEM

(76) Inventor: Kenichiro Oka, c/o Mitsubishi Denki Kabushiki Kaisha, 2-3, Marunouchi 2-chome, Chiyoda-ku, Tokyo 100-8310 (JP)

(*) Notice: Subject to any disclaimer, the term of this patent is extended or adjusted under 35 U.S.C. 154(b) by 346 days.

(21) Appl. No.: 10/943,930

(22) Filed: Sep. 20, 2004

(65) Prior Publication Data

US 2005/0250515 A1 Nov. 10, 2005

(30) Foreign Application Priority Data

May 10, 2004 (JP) ............................. 2004-139706

(51) Int. Cl.
*H04M 3/16* (2006.01)
*H04Q 7/20* (2006.01)
(52) U.S. Cl. ................................. 455/411; 455/456.1
(58) Field of Classification Search ................. 455/456, 455/41.2, 41.3, 410–411, 414.1, 414.2, 414.3, 455/418–419
See application file for complete search history.

(56) References Cited

U.S. PATENT DOCUMENTS

| | | | | |
|---|---|---|---|---|
| 5,748,736 A | * | 5/1998 | Mittra | 713/163 |
| 5,760,709 A | * | 6/1998 | Hayashi | 340/923 |
| 6,337,978 B1 | * | 1/2002 | Inoue | 455/421 |
| 6,768,934 B2 | * | 7/2004 | Sumida et al. | 701/1 |
| 6,959,173 B2 | * | 10/2005 | Kawai | 455/95 |
| 6,970,871 B1 | * | 11/2005 | Rayburn | 707/10 |
| 7,010,688 B1 | * | 3/2006 | Kawasaki | 713/168 |
| 2001/0053943 A1 | * | 12/2001 | Kaneko et al. | 700/94 |
| 2002/0034301 A1 | * | 3/2002 | Andersson | 380/270 |
| 2004/0059908 A1 | * | 3/2004 | Yamada et al. | 713/151 |

FOREIGN PATENT DOCUMENTS

| | | |
|---|---|---|
| JP | 2002-9691 A | 1/2002 |
| JP | 2002183782 A * | 6/2002 |

* cited by examiner

*Primary Examiner*—Rafael Pérez-Gutiérrez
*Assistant Examiner*—My X Nguyen
(74) *Attorney, Agent, or Firm*—Sughrue Mion, PLLC

(57) ABSTRACT

A local public information system can deliver public information to appropriate target persons in a local area at appropriate times, and make it possible for the persons to reconfirm the information once delivered, without incurring communication expenses and noise. The system includes an information delivery server and an on-board device for dedicated short-range radio communication both installed on a vehicle, a roadside device installed in the neighborhood of a road on which the vehicle is traveling; and a facility equipped with a base station server and an information output device connected to the roadside device. The vehicle with the information delivery server and the on-board device installed thereon circulates through the local area, so that public information or the like is delivered from the information delivery server to the base station server in the facility on a living quarter side through dedicated short-range radio communication between the on-board device and the roadside device.

7 Claims, 8 Drawing Sheets

LOCAL PUBLIC INFORMATION SYSTEM

BACKGROUND OF THE INVENTION

1. Field of the Invention

The present invention relates to a local public information system which serves to deliver public information in a limited area, and more particularly, to such a local public information system which is capable of limiting its delivery places so as to avoid the delivery to unnecessary areas, delivering public information (or public relations information) at appropriate times, preventing the generation of noise, reducing communication expenses, reconfirming the public information once delivered, and effectively delivering public information.

2. Description of the Related Art

In known local public information systems, as means for transmitting information to public information deliverees or receivers (residents, workers, etc.) within limited areas, use is made of loudspeaker vans, bulletin boards, circulars, public relations magazines, postal matters, electronic mails, community broadcasting, etc.

In addition, in recent years, it is proposed to use data broadcasting means according to digital broadcasting, the Internet and the like (for instance, see a first patent document: Japanese patent application laid-open No. 2002-9691).

Here, note that public information includes, for instance, town or community announcements, shop street or mall advertisements, administrative service information, election campaigns, etc.

In known local public information systems, there have been problems as described below. That is, various problems occur depending on means of use. For instance, in case of using a loudspeaker van, noise is generated, and besides, public information can be transmitted only to the persons who happen to be present at the place or scene. Moreover, transmitted information does not remain in the records, so it is impossible to make reconfirmation thereof.

Further, in cases where an election campaign is conducted while running an election campaign car, information can, in many cases, only be transmitted to such an extent that a candidate's name is repetitively shouted, so detailed public information such as campaign promises, political commitments, etc., cannot be transmitted.

Furthermore, in the case with a bulletin board, public information can be transmitted only to limited persons. In the case of using circulars, it takes time for public information to be transmitted, so lapsed or expired waste public information might be flown. In case where public relations magazines or postal matters are used, a lot of issue costs and postal expenses are incurred.

In addition, using electronic mails requires that the mail addresses of delivery destinations be registered beforehand, thus incurring communication expenses, too. In the case of using community broadcasting, only those who view or listen to the broadcast online can obtain information, and besides, the information transmitted does not remain in the records, and hence cannot be reconfirmed.

Moreover, in cases where a data broadcasting device or the like is used which transmits data through digital broadcasting, it is impossible to limit viewers or audiences to a specified area.

SUMMARY OF THE INVENTION

Accordingly, the present invention is intended to obviate the problems as referred to above, and has for its object to provide a local public information system which is capable of delivering public information to appropriate persons in a limited area at appropriate times, and making it possible for the persons to reconfirm the public information once delivered, to reduce communication expenses and to prevent the generation of noise.

A local public information system according to the present invention includes: an information delivery server and an on-board device for dedicated short-range radio communication both installed on a vehicle; a roadside device installed in the neighborhood of a road on which the vehicle is traveling; and a facility equipped with a base station server and an information output device connected to the roadside device. The information delivery server stores the public information. The information output device is connected to the roadside device through the base station server. The roadside device sets a covering range on the road, and establishes a communication link between itself and the on-board device of the vehicle that has come into the covering range on the road so as to perform dedicated short-range radio communication, whereby the public information is downloaded from the information delivery server to the base station server so that it is delivered to the information output device through the base station server.

According to the present invention, the places of delivery can be limited so as to avoid the delivery of information to unnecessary areas, and public information can be delivered at appropriate times. Also, it is possible to prevent the generation of noise, reduce communication expenses, reconfirm public information once delivered so as to make the delivery of the public information effective.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to accompanying drawings.

Embodiment 1

Figure 1:
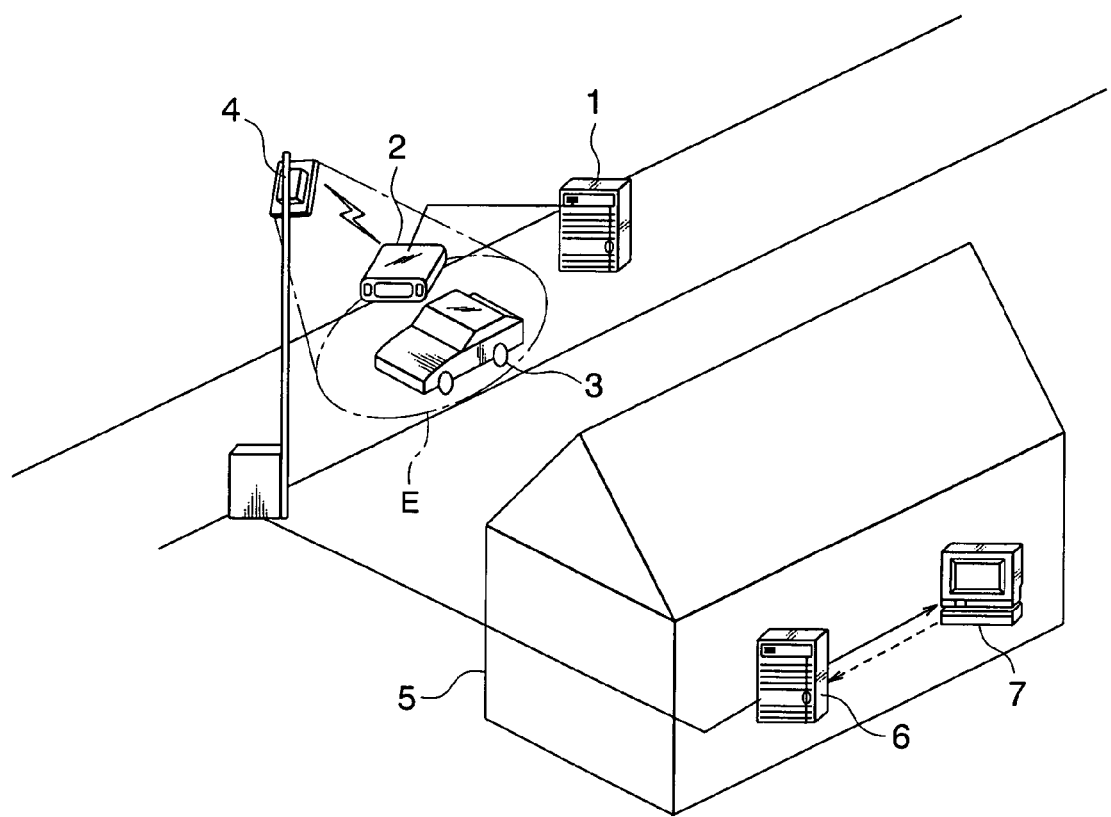
FIG. 1 is a perspective view diagrammatically illustrating a local public information system according to a first embodiment of the present invention.

FIG. 1 is a perspective view that diagrammatically shows a local public information system according to a first embodiment of the present invention.

For the sake of simplification of explanation, FIG. 1 illustrates the case where this local public information system is installed for exclusive use with a single facility 5 (e.g., dwelling, office, school, public hall, commercial facility, etc.), but it is needless to say that such a facilities 5 can be installed in an arbitrary number and at arbitrary locations.

In FIG. 1, an information delivery server 1 and an on-board device 2 for dedicated short-range radio communication, being mutually connected with each other, are installed on a vehicle 3.

A roadside device 4 for dedicated short-range radio communication is arranged in the neighborhood of a road on which the vehicle 3 is traveling, with a covering range E being set on the traveling road of the vehicle 3 for communications between the roadside device 4 and the on-board device 2 installed on the vehicle 3.

The facility 5 is provided with a base station server 6 connected to the roadside device 4, and an information output device 7 connected to the base station server 6.

The information delivery server 1 on the vehicle 3 stores public information or public relations information corresponding to the vehicle 3, and the information output device 7 in the facility 5 is connected to the roadside device 4 through the base station server 6.

The roadside device 4 establishes a communication link between itself and the on-board device 2 of the vehicle 3 coming into the covering range E on the traveling road so as to perform dedicated short-range radio communication. Public information is downloaded from the information delivery server 1 to the base station server 6 so that it is delivered to the information output device 7 through the base station server 6.

Here, note that the roadside device 4 and the base station server 6 is not limited to the case where they are installed with respect to the single facility 5 (dwelling, etc.) (see FIG. 1), but can instead be installed jointly with respect to a plurality of facilities (dwelling, office, etc.), for instance.

In this case, the information output device 7 is installed in an arbitrary number as required with respect to the roadside device 4 and the base station server 6.

Next, reference will be made to the operation of the local public information system according to this first embodiment of the present invention, as shown in FIG. 1.

First of all, a provider, a public institution or the like wanting to deliver public relations information prepares delivery information as electronic files, and copies these files to the information delivery server 1 installed on the vehicle 3.

Hereinafter, public information in the information delivery server 1 is downloaded through dedicated short-range radio communication between the on-board device 2 and the roadside device 4 from the information delivery server 1 to the base station server 6 in the facility 5 while the vehicle 3 is traveling in a local area.

That is, when the vehicle 3 comes into the covering range E of the roadside device 4, dedicated short-range radio communication is performed between the roadside device 4 and the on-board device 2.

At this time, as is well known in dedicated short-range radio communication, communication is established only within the covering range E which is extremely narrow, i.e., about 3 m-30 m.

When the vehicle 3 comes into the covering range E, the roadside device 4 and the on-board device 2 mutually detect and authenticate the other party before a communication link therebetween is established.

At this time, since a delivery origin or deliverer institution need not limit deliverees or delivery destinations if the delivery of public information to unspecified target persons (residents, workers, visitors, etc.) in a specified area is the purpose of application or use, the base station server 6 has only to authenticate at least the information delivery server 1.

However, in order to authenticate the information delivery server 1, the base station server 6 needs an authentication key allocated as a reliable source of information to the specific information delivery server 1, so it is necessary for the base station server 6 to register and hold therein such an authentication key beforehand.

Therefore, the base station server 6 includes an authentication key registration area which is manageable by the base station server 6, and in which the authentication key information inherent or unique to the information delivery server 1 is stored.

Here, it is assumed that the authentication key for the information delivery server 1 on the vehicle 3 visiting or entering the covering range E has already been registered in the authentication key registration area in the base station server 6 so as to deliver public information.

Figure 2:
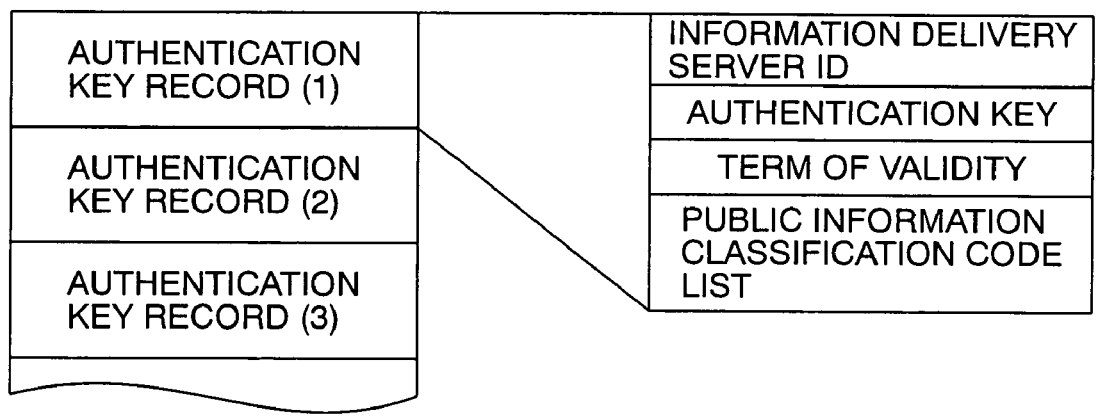
FIG. 2 is an explanatory view showing an example of the data organization of an authentication key registration area managed by a base station server according to the first embodiment of the present invention.

FIG. 2 is an explanatory view that shows an example of the data organization of the authentication key registration area managed by the base station server 6.

In FIG. 2, the identification (ID) of the information delivery server 1 and its authentication key, being associated with each other are stored in the information delivery server authentication key registration area in the base station server 6 as authentication key records (1), (2), (3), . . . .

Moreover, the validity term (available period) and the public information classification code list corresponding to the authentication key for each information delivery server 1 are added or attached to public information, whereby the validity term and usage of the information delivery server 1 are limited.

Codes indicating "Local communications","Advertisement","Election", etc., for instance, are considered as public information classification codes. In case where the same information delivery server 1 is permitted for utilization in a plurality of uses, public information classification codes are registered as a list.

Now, reference will be made to a concrete processing procedure when the base station server 6 according to the first embodiment of the present invention authenticates the information delivery server 1, while referring to a flow chart of FIG. 3.

Figure 3:
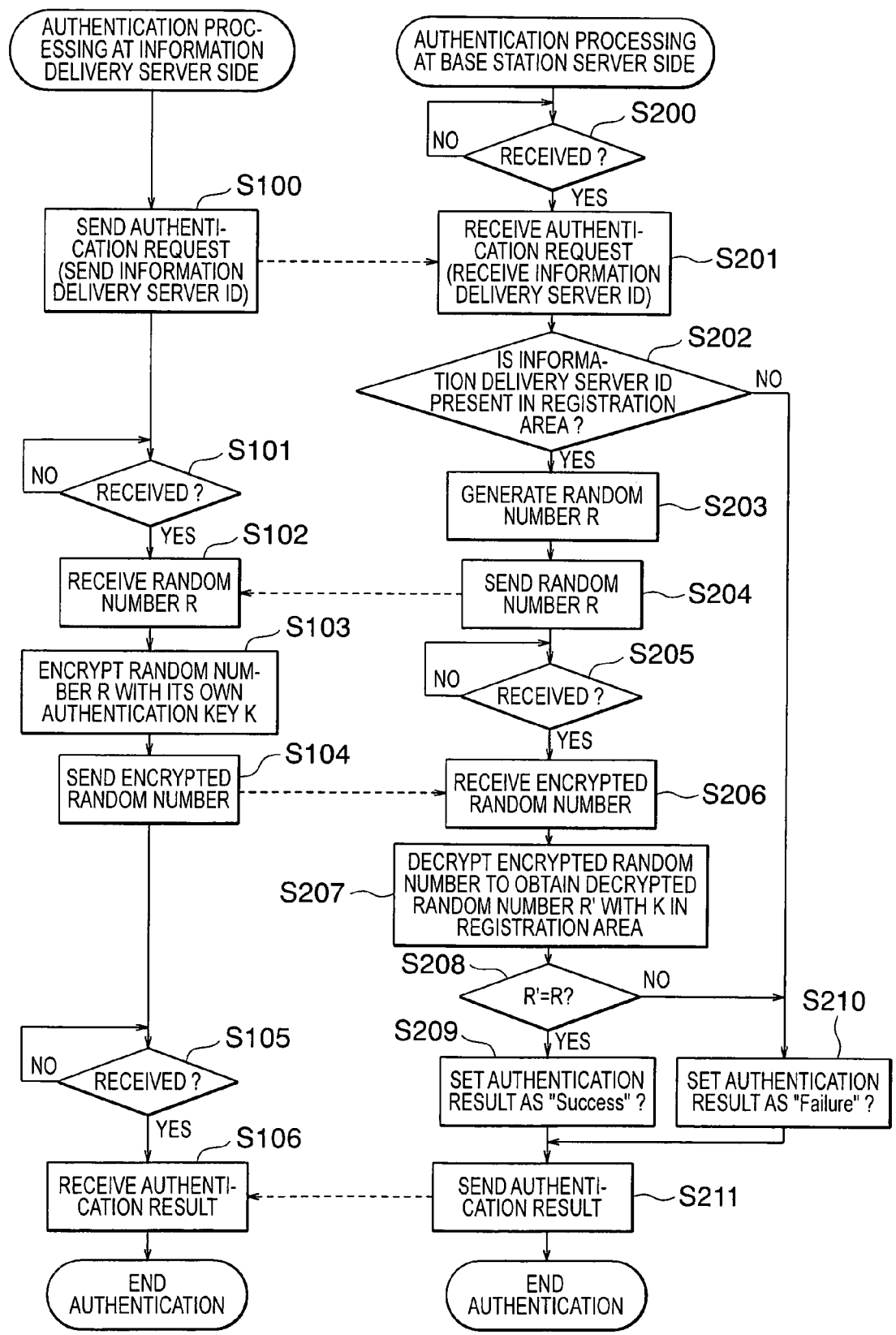
FIG. 3 is a flow chart showing a concrete processing procedure when the base station server according to the first embodiment of the present invention authenticates an information delivery server.

FIG. 3 illustrates, in parallel, the authentication processing (i.e., steps S100-S106) on the side of the information delivery server 1 and the authentication processing (i.e., steps S200-S211) on the side of the base station server 6 while associating them with each other.

Here, it is assumed that the authentication key in the form of a cryptographic key is a symmetric key (common key).

In FIG. 3, first of all, the information delivery server 1 sends an authentication request to the base station server 6 so as to notify it of its own information delivery server ID (step S100).

On the other hand, the base station server 6 is always in a reception standby state (step S200), and upon receipt of the authentication request from the information delivery server 1 (step S201), searches for the authentication key registration area (see FIG. 2) and determines whether the ID information of the information delivery server 1 for which authentication is asked is registered (step S202).

If it is determined in step S202 that the information delivery server ID thus received is not registered in the registration area (that is, NO), the base station server 6 sets the authentication result as "Failure" (step S210), whereas if determined that it is registered (that is, YES), a random number R is created (step S203) and then sent to the information delivery server 1 (step S204).

On the other hand, the information delivery server 1 after having sent the authentication request is in the reception standby state (step S101), and upon receipt of the random number R from the base station server 6 (step S102), encrypts or encodes the random number R with its own authentication key K (step S103) and sends it to the base station server 6 (step S104).

Also, the base station server 6 after having received the random number R is in a reception standby state (step S205), and upon receipt of the encrypted or encoded data of the random number R from the information delivery server 1 (step S206), extracts the authentication key from the information delivery server authentication key registration area (see FIG. 2), and decrypts or decode the encrypted data thereby to obtain a decrypted or decoded random number data R' (step S207).

Subsequently, the base station server 6 determines whether the decrypted random number data R' coincides with the original random number R (step S208), and if it is determined as R'=R (that is, YES), the information delivery server 1 is admitted as a reliable authorized server, and the authentication result is set as "Success" (step S209), whereas if it is determined as R'≠R (that is, NO), the information delivery server 1 is assumed to be an unauthorized or illegal server, and the authentication result is set as "Failure" (step S210).

Hereinafter, the base station server 6 sends the authentication result ("Success" or "Failure")to the information delivery server 1 (step S211), and completes the authentication processing of FIG. 3.

On the other hand, the information delivery server 1 after having sent the encrypted data is in the reception standby state (step S105), and completes the authentication processing of FIG. 3 upon receipt of the authentication result from the base station server 6 (step S106).

When the authentication result according to the processing routine of FIG. 3 is "Success",public information is downloaded from the information delivery server 1 to the base station server 6.

Next, reference will be made to the concrete data series sent from the information delivery server 1 to the base station server 6 in the information download processing while referring to a flow chart of FIG. 4.

Figure 4:
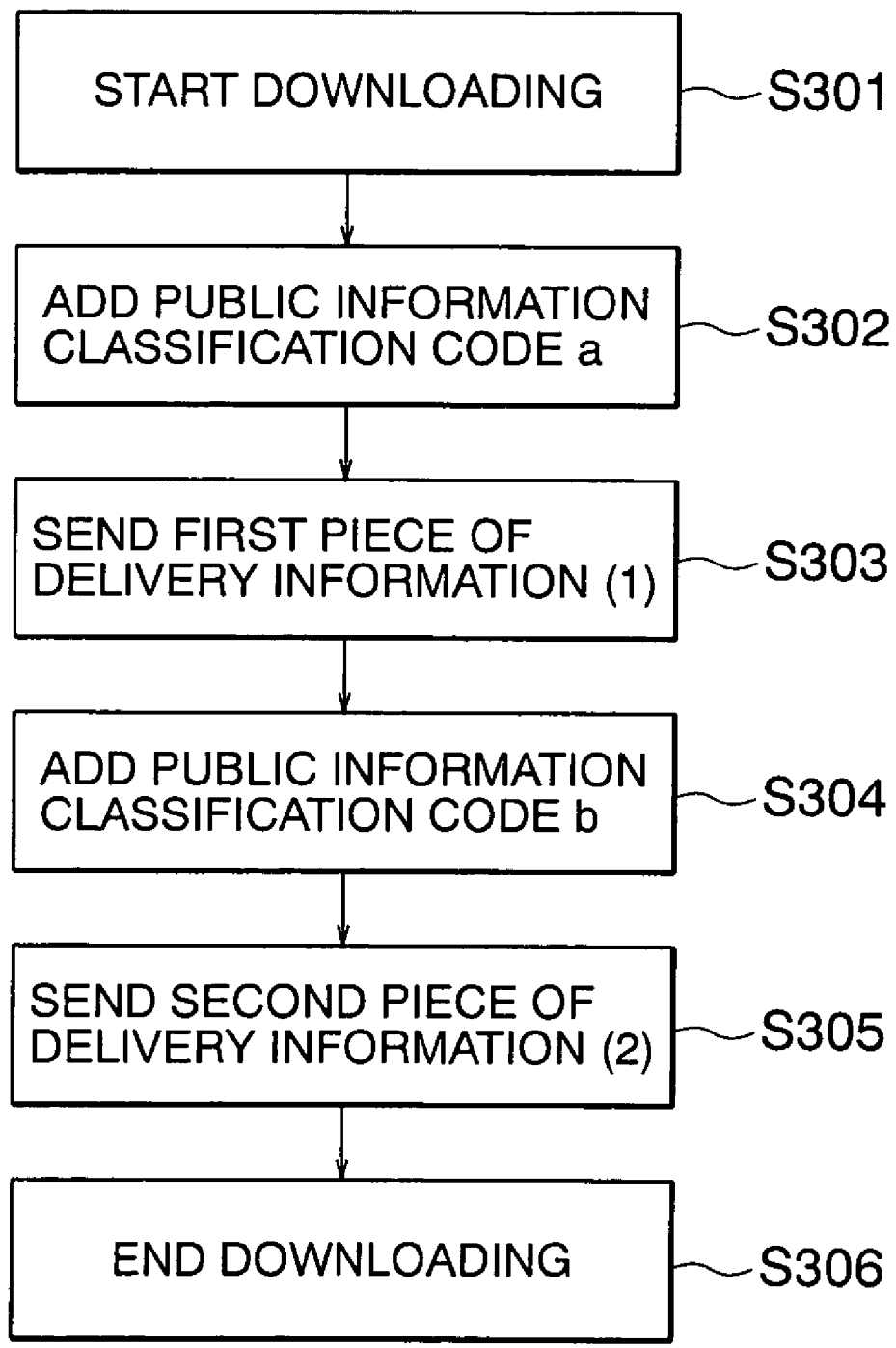
FIG. 4 is a flow chart showing concrete data series sent from the information delivery server to the base station server during information download processing according to the first embodiment of the present invention.

In FIG. 4, during the time from the first notification of the start of downloading (step S301) to the notification of the completion of downloading step S306), individual pieces of information are sequentially sent from the information delivery server 1 to the base station server 6 (steps S302-S305).

In the example of FIG. 4, there is illustrated the case where two pieces of public information (i.e., first and second delivery information pieces (1) and (2) are downloaded, with public information classification codes being notified before the downloading of the individual pieces of information.

That is, when the first piece of information (1) is sent (step S303), a public information classification code a is added or attached to the head of the first piece of information (1) before the sending thereof (step S302).

Similarly, when the second piece of information (2) is sent (step S305), a public information classification code b is added or attached to the head of the second piece of information (2) before the sending thereof (step S304).

Accordingly, the base station server 6 can control, based on the public information classification codes a and b, whether to accept the delivery of each of these pieces of information (1) and (2).

That is, upon receipt of the public information classification codes a and b, the base station server 6 examines the information delivery server 1 of the deliverer or delivery origin by referring to the authentication key registration area (FIG. 2), and verifies whether there exist codes in the public information classification code list declared or recorded beforehand which coincide with the public information classification codes a and b.

When there are no codes in the list which coincide with the public information classification codes a, b thus received, the base station server 6 sends a notification indicative of the refusal of reception to the information delivery server 1 in order to exclude unnecessary information.

Accordingly, the information delivery server 1 is permitted to deliver the public information pieces (1) and (2) to the base station server 6 only when it does not receive the refusal of reception from the base station server 6.

Thereafter, the public information received from the information delivery server 1 by the base station server 6 according to the download processing is transmitted from the information output device 7 to expected information receiving persons.

Here, note that the public information includes sentences, still pictures, videos, voices, any combinations thereof, etc.

Further, an indefinite number of expected information receiving persons can view or listen to the delivered public information at any convenient time by operating the information output device 7 to create an information delivery request (see a broken line arrow in FIG. 1).

Since the public information thus delivered can be held in and managed by the base station server 6 or the information output device 7, it is possible to arrange or organize various pieces of information according to fields by making use of the public information classification codes added or attached to the individual pieces of public information.

Furthermore, the function of the base station server 6 can be arbitrarily set by an input operation from the information output device 7 in accordance with a request of an expected information receiving person.

For instance, settings can be made in such a manner that reception of the pieces of information of those classifications in which the expected information receiving person has no concern or interest is refused or accepted but deleted soon even if received. Such processing can be done by using public information classification codes.

As described above, according to the first embodiment of the present invention, there can be achieved the following advantages. That is, by delivering public information while circulating through a target area with the vehicle 3, it is possible to deliver public information only in necessary places at appropriate times. Besides, communication expenses can be reduced or avoided by downloading information through dedicated short-range radio communication.

In addition, the base station server 6 can authenticate the information delivery server 1 with the use of an authentication key, and exclude an unnecessary information deliverer or delivery origin (e.g., the information delivery server 1) by adding or attaching a validity term to the authentication key.

Moreover, the base station server 6 and/or the information output device 7 can store or hold therein the public information delivered from the information delivery server 1, so that the information thus stored can be transmitted to absentees. Accordingly, those who receiving the information can confirm the information at a convenient time.

Further, by handling public information in an electronic form, the generation of noise can be avoided. Besides, by combining various contents, the information can be effectively transmitted.

Here, note that in the above-mentioned first embodiment, there have been described an example where the authentication key is a symmetric key, but it may be an asymmetry key.

Embodiment 2

Figure 5:
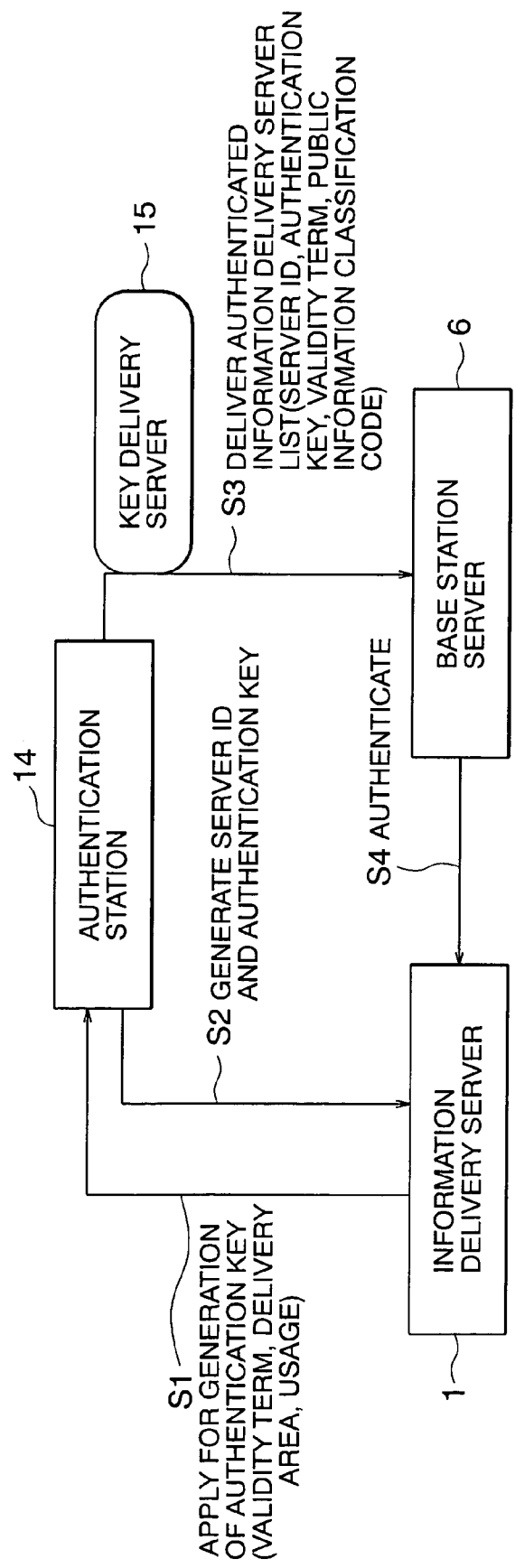
FIG. 5 is a block diagram showing the key generation function of a local public information system according to a second embodiment of the present invention.

Although in the above-mentioned first embodiment, no mention has been made to a higher-ranking institution for the generation of a key to manage the registered information of the information delivery server 1 and the base station server 6 (e.g., server IDs, authentication keys, etc.), an authentication authority or station 14 as shown in FIG. 5 can be used for this purpose.

FIG. 5 is a block diagram that shows the key generation function of the local public information system according to a second embodiment of the present invention, wherein the authentication key generation and delivery processing executed before the delivery of public information is diagrammatically illustrated.

In FIG. 5, the authentication station 14 includes an information delivery server 15 having a function similar to that of the information delivery server 1 of FIG. 1, and serves to deliver an authentication key from the information delivery server 15 to the base station server 6 so as to manage an information delivery server authentication key registration area in the base station server 6.

In addition, the authentication station 14 centrally manages the authorities of all information delivery servers 1 installed on vehicles 3.

The authentication station 14 issues or generates an authentication key to the registration area in the base station server 6 and carries out an initial registration thereof. The authentication station 14 provides to each of the plurality of information delivery servers 1 the authority for delivering information in a specified area within a specified period or duration for a specific use.

In FIG. 5, processes S1-S4 designated by arrows show a necessary procedure until the time when an information delivery server 1 is authenticated by the base station server 6, and the specific processing contents thereof are described below.

In process S1, the administrator of a specified information delivery server 1 (hereinafter referred to as the information delivery server 1) applies asks for the generation or insurance of an authentication key to the authentication station 14. At this time, information necessary for such an application includes, for example, a validity term, a delivery area, usage (public information classification code), etc.

In process S2, the authentication station 14 issues or generates a server ID and an authentication key to the information delivery server 1.

In process S3, the authentication station 14 delivers a validity term and a public information classification code list together with the server ID and the authentication key issued with respect to the information delivery server 1 to a base station server 6 within the target area in which information can be delivered by the information delivery server 1.

In process S4, the information delivery server 1 is authenticated by the base station server 6 based on the registered server ID and authentication key.

The ordinary information delivery server 1 delivers public information to human beings or persons, but the key delivery server 15 having the same function as that of the information delivery server 1 can play the role to deliver an authentication key to the base station server 6 in addition to the delivery of public information to persons.

Here, note that the key delivery server 15 means one that particularly delivers authentication keys, among information delivery servers 1.

Accordingly, the key delivery process C performed by the key delivery server 15 is carried out by the vehicle 3 with the key delivery server 15 installed as an information delivery server 1 circulating through a target delivery area.

In this case, even in case where the key delivery server 15 delivers information such as an authentication key to the base station server 6, similar to the case as stated above, it is necessary for the key delivery server 15 to be authenticated by the base station server 6 so that the base station server 6 admits the key delivery server 15 to have the authority of delivering keys.

Figure 6:
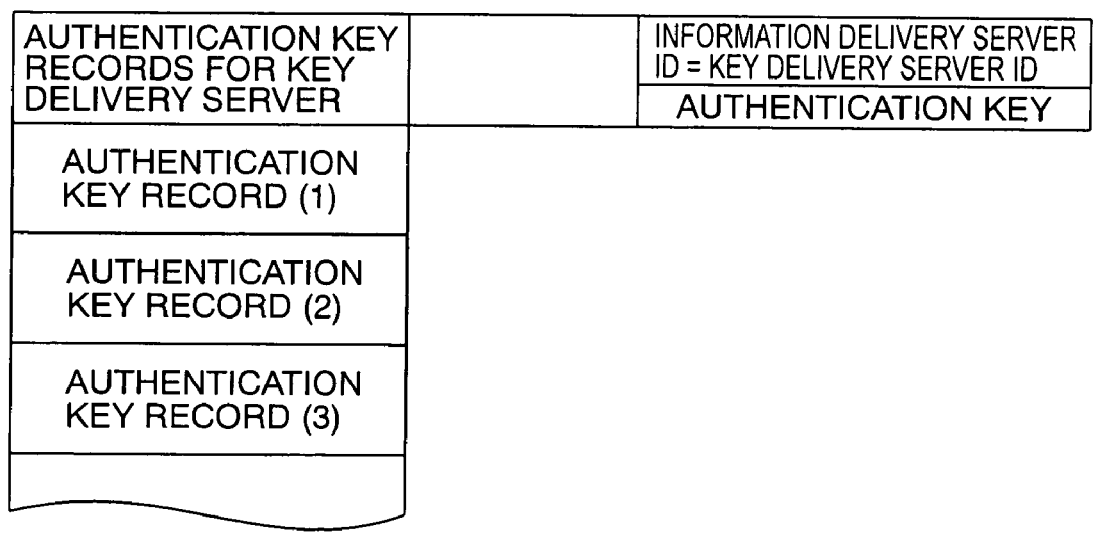
FIG. 6 is an explanatory view showing an example of the data organization of an authentication key registration area managed by a base station server according to a second embodiment of the present invention.

Accordingly, similar to the case of the above-mentioned general information delivery server 1, the key delivery server 15 is also required to have a server ID and an authentication key as a key delivery server issued from the authentication station 14, and to have an authentication key record for the key delivery server 15 registered in the information delivery server authentication key registration area of the base station server 6, for instance, as shown in FIG. 6.

FIG. 6 is an explanatory view that shows an example of the data organization of the authentication key registration area managed by the base station server 6 according to the second embodiment of the present invention.

In FIG. 6, a key delivery server ID is beforehand registered, as an information delivery server ID to authenticate the key delivery server 15, in the information delivery server authentication key registration area of the base station server 6.

Here, note that the key delivery server ID to authenticate the key delivery server 15 may be registered by using an authentication station (not shown) of a higher level than the authentication station 14 on the Internet, and it can be set up by an installation dealer at the time of installation of the base station server 6, while having the authentication key issued from the authentication station 14.

After the authentication by the base station server 6, the key delivery server 15 sends the authentication information of the information delivery server 1 newly admitted by the authentication station 14 to the base station server 6, so that authentication key records (1), (2), (3), . . . , in the information delivery server authentication key registration area of the base station server 6.

Here, note that the key delivery server 15 may deliver the authentication key records (1), (2), (3), . . . , collectively for a plurality of cases.

Additionally, the key delivery server 15 can not only deliver new authentication records but also delete authentication key records that have expired or become invalid, or update registered authentication key records.

Further, the updating of the information delivery server authentication registration area in the base station server 6 can be performed not only by an external operation from the key delivery server 15 but also by the base station server 6 itself.

For instance, the base station server 6 can autonomously delete or remove those of authentication key records which have their validity terms expired.

Incidentally, it is considered that the key delivery server 15 can carry out the delivery of general information in addition to the delivery of keys.

Embodiment 3

Although in the above-mentioned second embodiment, no mention has been made to any concrete example of application of public information, public information can be applied to a plurality of election campaign cars 3a through 3b.

Figure 7:
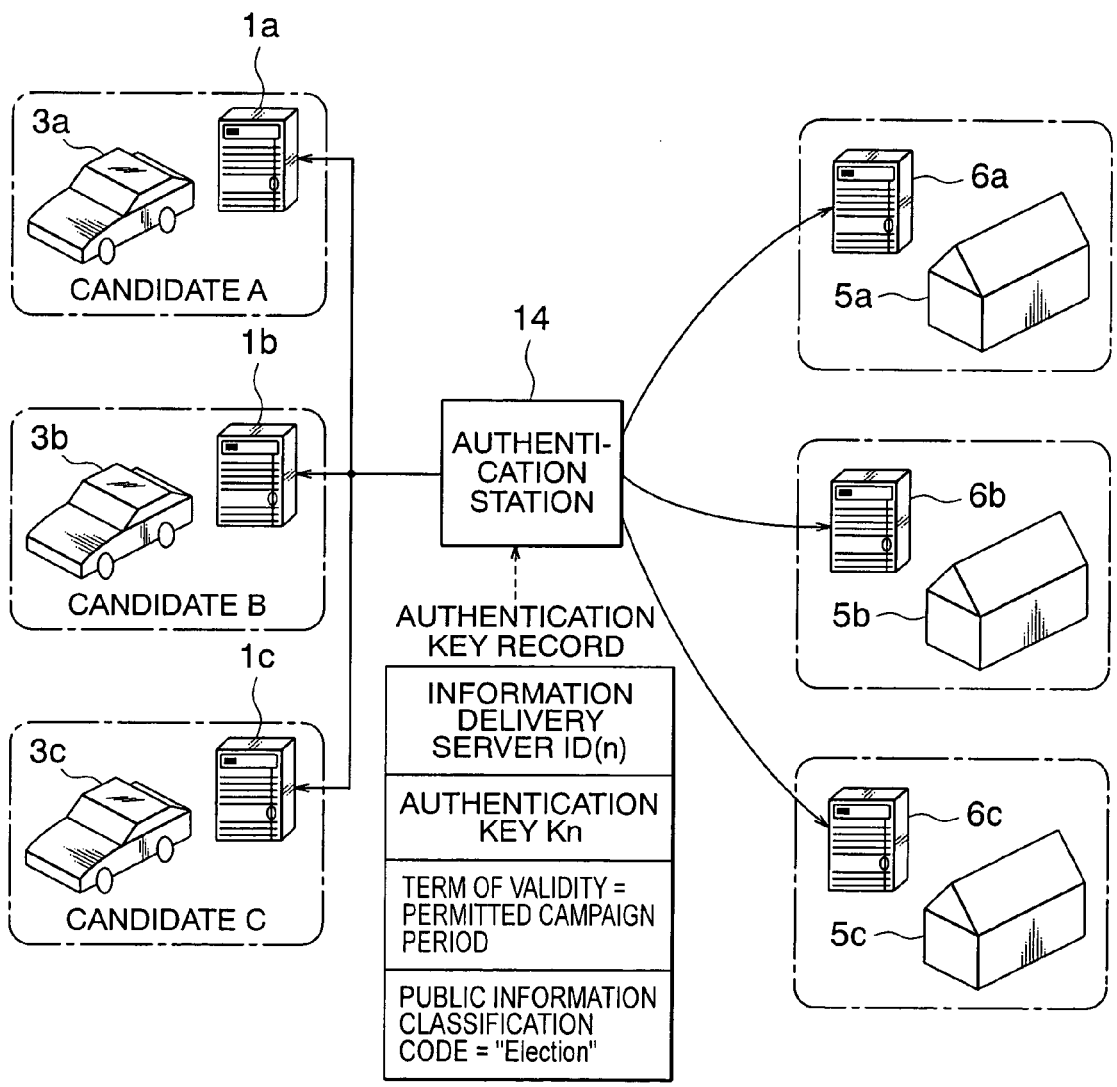
FIG. 7 is a configuration view diagrammatically showing initial registration processing in a concrete example of application of a local public information system according to a third embodiment of the present invention, while illustrating the case where the present invention is applied to a candidate's campaign with an election campaign car.

FIG. 7 is a configuration view that diagrammatically illustrates initial registration processing in a concrete application example of the local public information system according to a third embodiment of the present invention, wherein the processing when the invention is applied to candidates' campaigns using three election campaign cars 3a-3c is shown together with the contents of authentication key records.

In FIG. 7, information delivery servers 1a-1c are installed on the election campaign cars 3a-3c of candidates A-C, respectively.

In addition, base station servers 6a-6c are also installed in facilities 5a-5c, respectively.

When the candidates A-C finish their candidature procedures, respectively, each of the candidates A-C receives an information delivery server ID and an authentication key for each of the election campaign cars 3a-3c issued from the authentication station 14 to the information delivery servers 1a-1c.

Here, note that the authentication station 14 may issue a single information delivery server ID(n) and a single authentication key Kn for the respective election campaign cars 3a-3c at each election, as shown in FIG. 7.

In this case, in order for the candidates A-C to go on the campaign trails immediately after they have finished their candidature procedures, the authentication station 14 beforehand delivers the authentication key records to the base station servers 6a-6c arranged in the base facilities 5a-5c in each of their electoral districts, so that information to authenticate the information delivery servers 1a-1c of the election campaign cars 3a-3c can be registered in the information delivery server authentication key registration areas in the base station servers 6a-6c.

A validity term (=permitted campaign period) and a public information classification code (="Election")are set in each authentication key record.

A campaign trail outside the permitted campaign period can be excluded by setting the period for which an election campaign is admitted as the validity term of each authentication key record in this manner.

By using the local public information system of this embodiment for the campaign trail, as shown in FIG. 7, public information (election information) can be transmitted to any voters without limiting to the voters present in the place.

Moreover, a lot of information can be effectively transmitted to voters by combining candidate's name, photographs, political commitments, etc., with one another.

By properly using an election campaign method adopting information delivery by the above-mentioned local public information system in combination with calling from a loudspeaker and another election campaign method employing only the local public information system, an election campaign can be carried out with due consideration to noise depending upon the place of the campaign.

Although in this third embodiment, reference has been exemplarily made to the case where the same information delivery server ID(n) and the same authentication key Kn are issued for all the election campaign cars 3a -3c , an information delivery server ID and an authentication key K may be issued individually for each of the election campaign cars 3a-3c.

Embodiment 4

Figure 8:
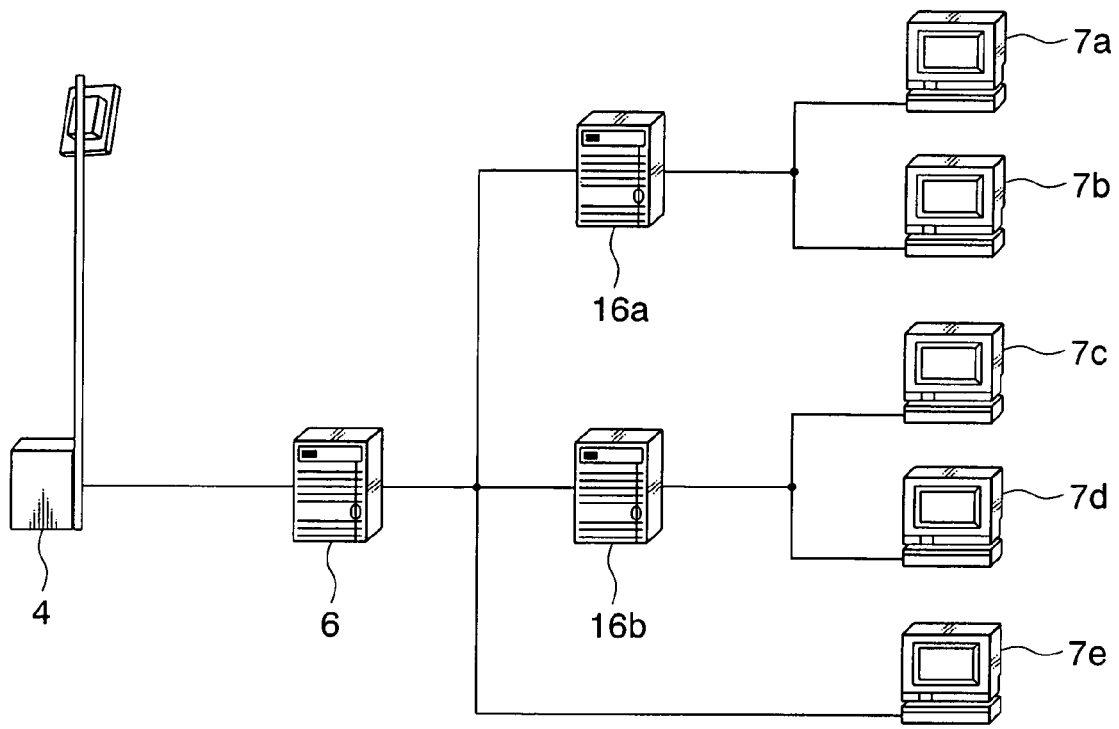
FIG. 8 is a configuration view diagrammatically showing the essential portions of a local public information system according to a fourth embodiment of the present invention.

Although in the above-mentioned first through third embodiments, the base station server 6 and the information output device 7 are directly connected with each other, child servers 16a, 16b may be interposed therebetween, as shown in FIG. 8.

FIG. 8 is a configuration view that diagrammatically shows the essential portions of a local public information system according to a fourth embodiment of the present invention, wherein the child servers 16a, 16b are exemplarily illustrated as being interposed between the base station server 6 and a plurality of information output devices 7a-7e, as necessary.

FIG. 8 illustrates the case where the multitude of information output devices 7a-7e are managed from a single roadside device 4 and the base station server 6, to which the plurality of information output devices 7a-7e are connected.

The parts of the configuration of this embodiment not shown in FIG. 8 are the same as those shown in FIG. 1.

The child server 16a is interposed between the base station server 6 and the information output devices 7a, 7b; the child server 16b is interposed between the base station server 6 and the information output devices 7c, 7d; and the base station server 6 and the information output device 7e are directly connected with each other.

In FIG. 8, each of the child servers 16a, 16b is installed in units of home and/or in units of building for relaying information transmission between the information output devices 7a-7d that serve as terminals and the base station server 6 that performs base or site management.

For instance, an information delivery request from the information output devices 7a, 7b is sent to the base station server 6 through the child server 16a, and an information delivery request from the information output devices 7c, 7d is sent to the base station server 6 through the child server 16b .

In this case, the base station server 6 directly controls the information output device 7e.

The base station server 6 beforehand registers delivery conditions for the respective information output devices 7a-7e placed under its own management in its deliveree or delivery destination registration area as their requests.

Accordingly, when information is downloaded from the information delivery server 1, the information can be delivered to the respective information output devices 7a-7e according to the delivery conditions thus registered beforehand.

At this time, the delivery conditions for the information output devices 7a-7e to accept the delivery of information are set based on the designations of content types and public information classification codes.

For instance, some of the information output terminals 7a-7e can reproduce only sentences but can not handle images and voices, or can handle only voices, so there might sometimes be limitations to the contents that can be processed by the information output terminals 7a-7e.

In addition, it is considered that information, the delivery of which is wanted by users using the information output devices 7a-7e, can be narrowed or selected by public information classification codes in accordance with the concern or interest of the users. For instance, the delivery of "Advertisements" can be made unnecessary by proper handling of a corresponding public information classification code.

Next, reference will be made to the operation of the local public information system according to this fourth embodiment of the present invention, as shown in FIG. 8, while referring to FIG. 1.

First of all, after receiving public information downloaded from the information delivery server 1, the base station server 6 directly forwards the public information to the information output device 7e under its own management, and the public information is forwarded to the information output devices 7a-7d through the child servers 16a, 16b.

At this time, the base station server 6 compares the content types and the public information classification codes of the downloaded public information with the requests from the information output devices 7a-7e beforehand registered in the deliveree or delivery destination registration area, and delivers the public information to the information output devices 7a-7e only when there are agreements in both of the conditions (i.e., the content types and the public information classification codes).

In addition, the child servers 16a, 16b bears the delivery control function similar to the base station server 6 by registering the delivery request condition from the information output devices 7a-7d under their own management with respect to the information output devices 7a-7d.

That is, when public information is delivered to the child servers 16a, 16b from the base station server 6, the child servers 16a, 16b determines whether the public information should be secondarily delivered to the respective information output devices 7a-7d, by making reference to the delivery request conditions from the information output devices 7a-7d under their own management.

In this manner, the shared use of the single roadside device 4 and the single base station server 6 installed in common by a plurality of facilities 5 (dwellings, offices, etc.) provides the following new advantage in both parties at the delivery side of public information and at the reception side of public information.

Specifically, at the delivery side of public information, the shared or common use of the roadside device 4 serves to reduce the number of sites or locations at which information is downloaded, thus making it possible to improve efficiency in the delivery of information.

Also, at the reception side, even in cases where a facility 5 (dwelling, etc.) does not face the road so it is impossible to install a roadside device 4 therefor, or where there is no sufficient space for installation of a roadside device 4 because of a narrow traveling road (road way or site), the joint or shared use of equipment of another roadside device 4 can be made with collective housing such as apartments, etc.

To summarize, a local public information system according to the present invention can provide the following advantages. Information is delivered through dedicated short-range radio communication from the vehicle 3 which has the information delivery server 1 and the on-board device 2 installed thereon and which is circulating through an information delivery region, and at the same time, by the provision of the dedicated short-range radio communication roadside device 4 at the side of the facility 5 (living quarter) receiving the delivery of information, the base station server 6 connected to the roadside device 4, and the information output device 7 (or the plurality of information output devices 7a-7e) connected directly (or through the child servers 16a, 16b) to the base station server 6, public information can be delivered at appropriate times. In addition, the place of information delivery can be limited so as to avoid the delivery of information to unnecessary areas.

Moreover, delivery information is downloaded from the information delivery server 1 and the on-board device 2 to the base station server 6 via the roadside device 4 through dedicated short-range radio communication. Accordingly, public information can be effectively transmitted in various combinations of contents without incurring noise and communication expenses.

Further, since the information output device 7 (or the plurality of information output devices 7a-7e) is connected directly (or through the child servers 16a, 16b) to the base station server 6, it is possible to impart information to absentees, too, and besides, receivers at the reception side can view delivered information at convenient times, and also can reconfirm accumulated public information.

Furthermore, the base station server 6 has the authentication key registration area for registering an authentication key to authenticate the information delivery server 1 (or the key delivery server 15), and can exclude unnecessary information delivery origins or deliverers by registering, deleting and updating authentication keys with respect to the base station server 6 from the information delivery server 1 (or the key delivery server 15).

Also, by registering, deleting and updating authentication keys with respect to the base station server 6 from the key delivery server 15 of the authentication station 14, it is possible to effectively carry out the delivery of authentication keys with the use of the same mechanism as in the case of the ordinary information delivery server 1.

In addition, an expiration date or a validity term is set for each authentication key, so that the authentication keys registered in the base station server 6 are removed from the base station server 6 when their validity terms have expired. As a result, even if an information delivery server 1 whose validity term has expired visits the base station server 6 for delivery of information, it is not authenticated by the base station server 6. Accordingly, the delivery of information by the lapsed or expired information delivery server 1 can be precluded.

Moreover, by providing one and the same authentication key to the plurality of information delivery servers 1a-1c, it is possible to achieve commonality of the delivery of authentication keys to the individual information delivery servers 1a-1c for the same purpose. As a consequence, the authentication station 14 can manage the authentication keys in an efficient manner, and besides, the key delivery to the base station server 6 and the authentication key management in the base station server 6 can be improved in efficiency.

Further, each piece of information to be delivered is added or attached by a public information classification code, and an authentication key, being combined with a single or a plurality of public information classification code(s), is stored in advance in the authentication key registration area in the base station server 6, so that upon authentication of the information delivery server 1 with the authentication key, the base station server 6 can receive only those pieces of public information which are added or attached by the public information classification code(s) registered in association with the authentication key. Therefore, it is possible to preclude unnecessary information from being received by the base station server 6.

Furthermore, the base station server 6 has a deliveree or delivery destination registration area, in which there are registered in advance public information classification codes or content types by which pieces of delivery information are designated for each of the information output devices 7a-7e (or the child servers 16a, 16b) placed under the management of the base station server 6. With this, when public information is downloaded to the base station server 6 from the information delivery server 1, the base station server 6 is able to deliver those pieces of public information which are requested by each of the information output devices 7a-7e (or each of the child servers 16a, 16b) while making reference to the deliveree registration area. Thus, required information can be selectively received in each of the information output terminals 7a-7e in accordance with various constraints, users' concerns or interests, etc.

While the invention has been described in terms of preferred embodiments, those skilled in the art will recognize that the invention can be practiced with modifications within the spirit and scope of the appended claims.

What is claimed is:

1. A local public information system comprising:
   an information delivery server and an on-board device for dedicated short-range radio communication both installed on a vehicle;
   a roadside device installed in the neighborhood of a road on which said vehicle is traveling; and
   a facility equipped with a base station server and an information output device connected to said roadside device;
   wherein said information delivery server stores said public information;
   said information output device is connected to said roadside device through said base station server; and
   said roadside device sets a covering range on said road, and establishes a communication link between itself and said on-board device of said vehicle that has come into said covering range on said road so as to perform dedicated short-range radio communication, whereby said public information is downloaded from said information delivery server to said base station server so that it is delivered to said information output device through said base station server,
   wherein said public information includes at least one of announcements, advertisements, service information, and campaign information,
   wherein said public information includes an authentication key to authenticate said information delivery server;
   said base station server has an authentication key registration area to register said authentication key; and
   said roadside device registers, deletes and updates said authentication key in said authentication key registration area from said information delivery server, and
   wherein said public information includes a public information classification code that designates first delivery information for each information output device that is placed under the management of said base station server;
   said authentication key is registered in said authentication key registration area while being combined with said public information classification code;
   said base station server includes a first delivery destination registration area in which said public information classification code is registered;
   upon authentication of an information delivery server with said authentication key, said base station server is made effective to receive only those pieces of public information which are added in advance by a public information classification code registered in association with said authentication key; and
   when said public information is downloaded from said information delivery server, said base station server delivers to said information output device the public information requested thereby while making reference to said first delivery destination registration area.

2. The local public information system as set forth in claim 1, wherein said authentication key includes validity term information that is set from the outside; and
   said authentication key registered in said authentication key registration area is removed from said base station server at the time when said validity term is expired.

3. The local public information system as set forth in claim 1, wherein
   said information delivery server is individually installed on each of a plurality of vehicles; and
   one and the same authentication key is provided to said plurality of information delivery servers corresponding to said plurality of vehicles.

4. The local public information system as set forth in claim 1, wherein
   said public information includes a content type that designates second delivery information for each information output device that is placed under the management of said base station server;
   said base station server includes a delivery destination registration area in which said content type is registered; and
   when said public information is downloaded from said information delivery server, said base station server delivers to said information output device the public information requested thereby while making reference to the delivery destination registration area.

5. The local public information system as set forth in claim 1, wherein
   a child server is interposed between said base station and said information output device.

6. The local public information system as set forth in claim 1, wherein
   a plurality of information output devices are connected to said base station.

7. The local public information system as set forth in claim 1, wherein said roadside device comprises only one antenna.

* * * * *